US005306814A

United States Patent [19]

Akahori et al.

[11] Patent Number: 5,306,814

[45] Date of Patent: Apr. 26, 1994

[54] BISAZO COMPOUNDS HAVING SULFOPHENYLAZONAPHTYLAZO-PHENYLAMINO-S-TRIAZINYL GROUP AND USE THEREOF FOR DYEING OR PRINTING FIBER MATERIALS

[75] Inventors: Kingo Akahori; Takeshi Washimi, both of Toyonaka; Takashi Omura, Kobe; Mahito Fujita, Ibaraki, all of Japan

[73] Assignee: Sumitomo Chemical Company, Limited, Osaka, Japan

[21] Appl. No.: 993,713

[22] Filed: Dec. 17, 1992

[30] Foreign Application Priority Data

| | | | |
|---|---|---|---|
| Dec. 26, 1991 | [JP] | Japan | 3-344606 |
| Jan. 10, 1992 | [JP] | Japan | 4-002841 |
| Aug. 26, 1992 | [JP] | Japan | 4-227066 |

[51] Int. Cl.[5] .................. C09B 62/513; D06P 1/384

[52] U.S. Cl. .................. 534/642; 534/637; 8/549

[58] Field of Search .................. 534/637, 642

[56] References Cited

U.S. PATENT DOCUMENTS

| | | | |
|---|---|---|---|
| 4,430,259 | 2/1984 | Mischke et al. | 534/642 |
| 4,652,634 | 3/1987 | Mischke et al. | 534/642 |
| 4,698,421 | 10/1987 | Kayane et al. | 534/642 |
| 5,112,959 | 5/1992 | Miyamoto et al. | 534/642 |

FOREIGN PATENT DOCUMENTS

| | | |
|---|---|---|
| 0051807 | 5/1982 | European Pat. Off. . |
| 0266774 | 5/1988 | European Pat. Off. . |
| 0400648 | 12/1990 | European Pat. Off. . |

*Primary Examiner*—Mary C. Lee

*Assistant Examiner*—Fiona T. Powers

*Attorney, Agent, or Firm*—Stevens, Davis, Miller & Mosher

[57] ABSTRACT

A bisazo compound represented by the following formula (I) in the free acid form:

(I)

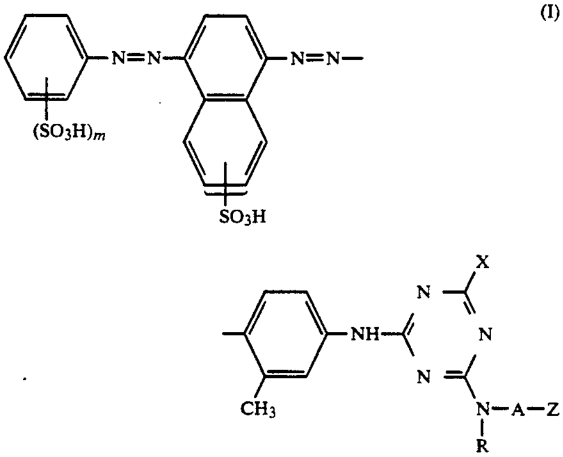

wherein R is hydrogen or unsubstituted or substituted $C_1$-$C_4$ alkyl; A is an unsubstituted or substituted phenylene or naphthylene group; Z is —$SO_2CH$=$CH_2$ or —$SO_2CH_2CH_2Y$, in which Y is a group capable of being split by the action of an alkali; X is —$NR_1R_2$, $C_5$-$C_7$ cycloalkylamino or

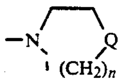

in which Q is —$CH_2$—, —O—, —$SO_2$—, —SO— or —$NR_3$— in which $R_3$ is hydrogen or $C_1$-$C_4$ alkyl; and n is 1 or 2; $R_1$ is hydrogen or unsubstituted or substituted alkyl; $R_2$ is hydrogen or an unsubstituted or substituted alkyl or phenyl group; and m is 1 or 2, provided that when m is 2, X is

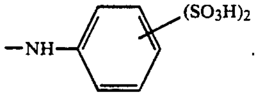

This compound is suitable for dyeing and printing cellulose fiber, natural and synthetic polyamide fibers, polyurethane fiber, leather and mixed yarns thereof, to obtain dyed or printed products of a color fast to light and wetness with superior build-up property.

15 Claims, No Drawings

BISAZO COMPOUNDS HAVING SULFOPHENYLAZONAPHTYLAZO-PHENYLAMINO-S-TRIAZINYL GROUP AND USE THEREOF FOR DYEING OR PRINTING FIBER MATERIALS

The present invention relates to improved compounds which are suitable for use in the deying and printing of materials containing hydroxyl group and/or amide group, particularly those such as cellulose fibers, natural and synthetic polyamide fibers, polyurethane fibers and leathers and further mixed fibers thereof, to obtain dyed or printed products of light brown color fast to light and wetness, and applications of the compounds.

Light brown colored bisazo compounds having vinyl sulfone reactive group in their molecule are known as disclosed in EP 167858. However, they are yet insufficient in the dye performances such as build-up property, and a further improvement has been demanded.

Hitherto, various reactive dyes have widely been used in the field of dyeing or printing of fiber materials. However, the present technical standard cannot be said to be satisfactory in view of the high requirement on suitability for specific dyeing methods and enhancement of requirement on fastness of dyed products. The above-mentioned known reactive dyes are insufficient in dye performances such as build-up property etc. and in fastness properties, particularly fastnesses to light and wetness, and further improved dyes have been desired.

Superiority in build-up property, fastness to wetness and fastness to light is important today when level of requirement for dyeing with reactive dyes is increasingly raised. The inventors have conducted extensive studies in an attempt to improve the defects of the known dyes and to find novel compounds which can sufficiently satisfy the requirements demanded for dyes and as a result, accomplished the present invention.

The present invention provides a bisazo compound represented by the following formula (I) in the free acid form:

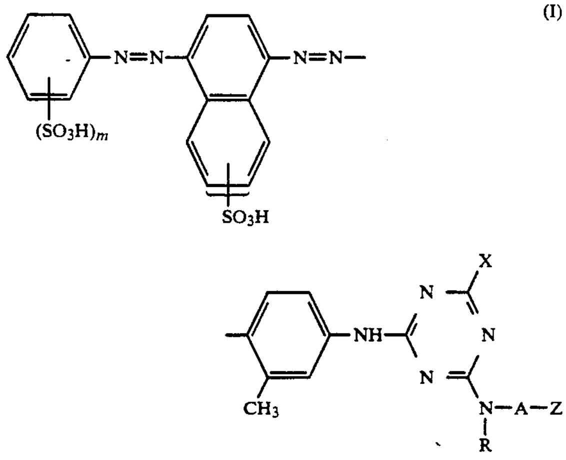

(I)

wherein R is hydrogen or unsubstituted or substituted $C_1$-$C_4$ alkyl; A is an unsubstituted or substituted phenylene or naphthylene group; Z is $—SO_2CH═CH_2$ or $—SO_2CH_2CH_2Y$, in which Y is a group capable of being split by the action of an alkali; X is $—NR_1R_2$, $C_5$-$C_7$ cycloalkylamino or

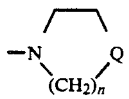

in which Q is $—CH_2—$, $—O—$, $—SO_2—$, $—SO—$ or $—NR_3—$ in which $R_3$ is hydrogen or $C_1$-$C_4$ alkyl; and n is 1 or 2; $R_1$ is hydrogen or unsubstituted or substituted alkyl; $R_2$ is hydrogen or an unsubstituted or substituted alkyl or phenyl group; and m is 1 or 2, provided that when m is 2, X is

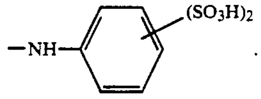

The present invention further provides a process for producing the bisazo compounds of formula (I) and a method for dyeing or printing a fiber material using said bisazo compounds.

Among the bisazo compounds of the present invention represented by the formula (I), the bisazo compounds represented by the following formulas (II) and (V) in the free acid form are preferable:

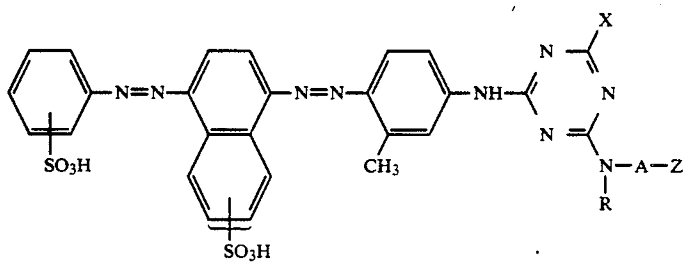

(II)

-continued
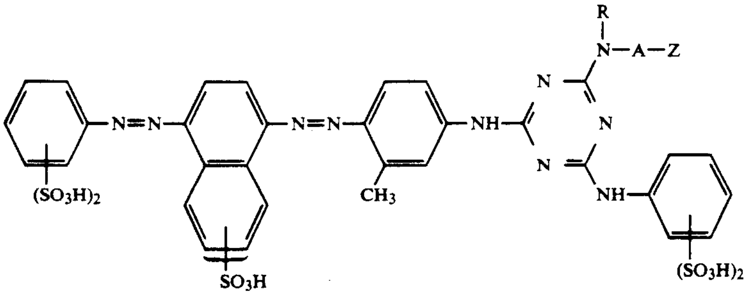
(V)
wherein X, R, A and Z are as defined above. Among these bisazo compounds, the bisazo compounds represented by the following formulas (III), (IV) and (VI) are further preferable:
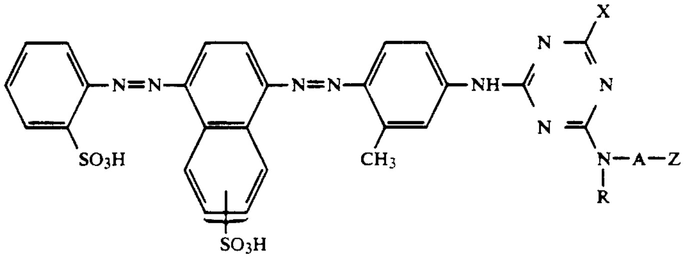
(III)
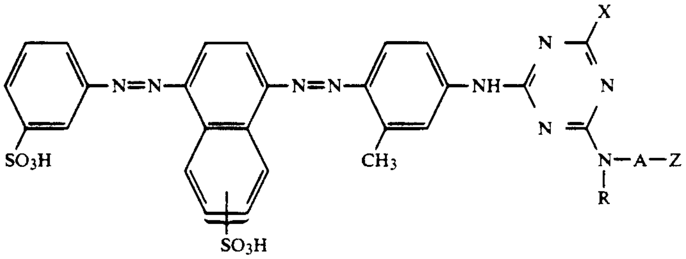
(IV)
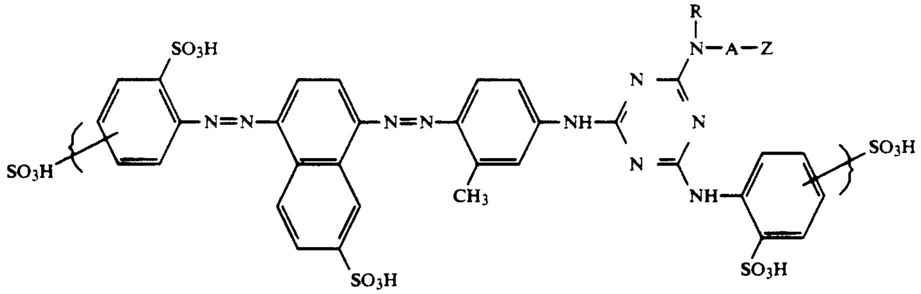
(VI)
wherein X, R, A and Z are as defined above. Among them, the bisazo compounds represented by the following formulas (III)', (IV)' and (VII) are particularly preferable:
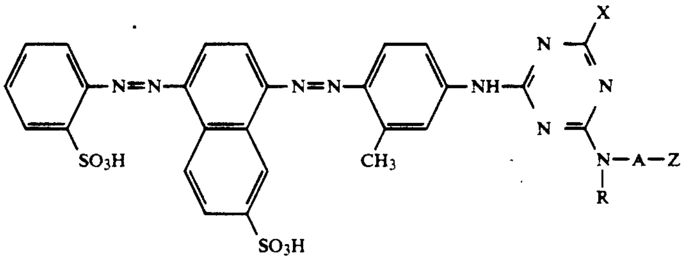
(III)'

-continued

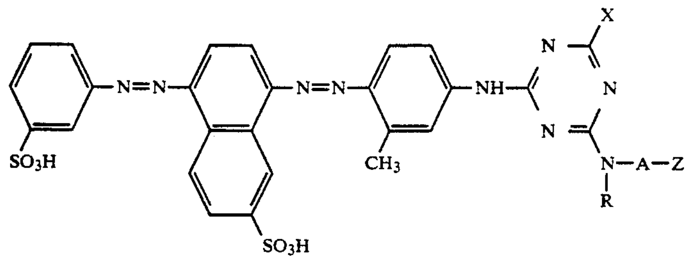

(IV)'

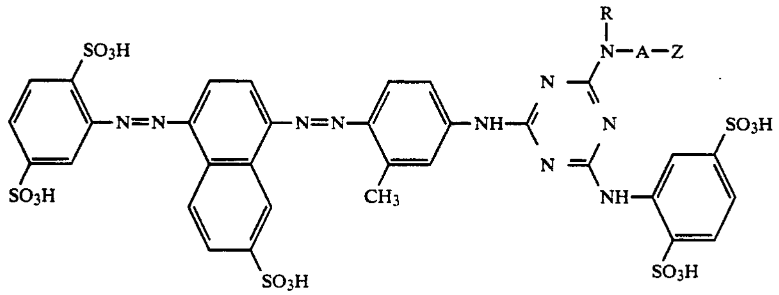

(VII)

wherein X, R, A and Z are as defined above.

As the substituent on the substituted phenylene represented by A in formula (I), mention may be made of, for example, methyl, ethyl, methoxy, ethoxy, chloro, bromo, nitro, carboxy and sulfo. Thus, the phenylene is preferably a phenylene unsubstituted or substituted once or twice by a substituent selected from the group consisting of methyl, methoxy, chloro, bromo, nitro, carboxy and sulfo, and particularly preferably a phenylene unsubstituted or substituted by methyl or methoxy. As the naphthylene represented by A, a naphthylene unsubstituted or substituted by sulfo is preferable. Concrete examples of the phenylene and naphthylene represented by A include the following:

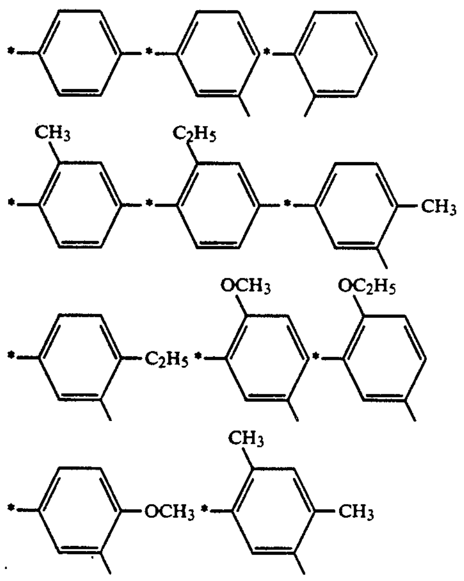

-continued

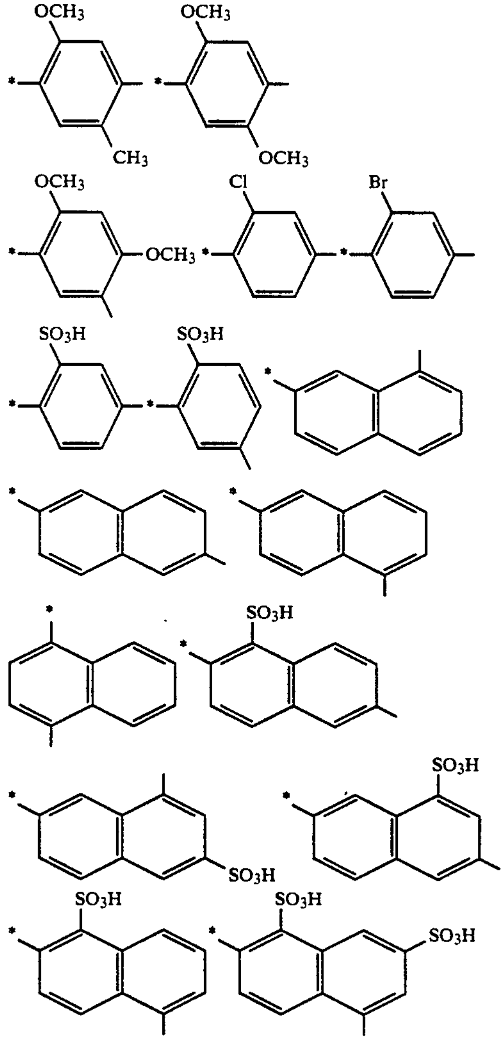

wherein the mark * means a bond linking to group

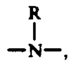

and the like.

As the phenylene represented by A, groups represented by the following formulas:

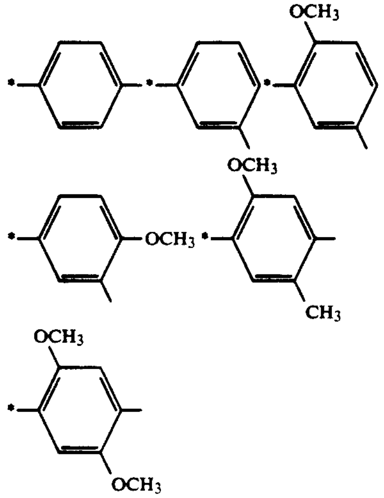

wherein the mark * means a bond linking to

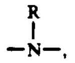

and the like are particularly preferable.

Among these groups, 1,3-phenylene and 1,4-phenylene are more preferable, and a group represented by the following formula:

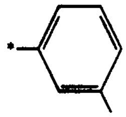

wherein the mark * is as defined above, is particularly preferable.

As the group represented by Y capable of being split by the action of alkali, mention may be made of, for example, sulfuric ester, thiosulfuric ester, phosphoric ester, acetic ester, halogen and the like, among which sulfuric ester is preferable.

As the unsubstituted or substituted alkyl represented by R and $R_1$, alkyl having 1–4 carbon atoms is preferable. As the substituent with which the alkyl may be substituted, hydroxy, cyano, alkoxy, halogen, carbamoyl, carboxy, alkoxycarbonyl, alkylcarbonyloxy, sulfo and sulfamoyl are preferable.

As preferable R and $R_1$, mention may be made of, for example, hydrogen, methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl. Among them, hydrogen, methyl and ethyl are particularly preferable as R and $R_1$.

As the unsubstituted or substituted alkyl represented by $R_2$, alkyl having 1–4 carbon atoms unsubstituted or substituted once or twice by a substituent selected from the group consisting of alkoxy having 1–4 carbon atoms, sulfo, carboxy, hydroxy, chloro, phenyl and sulfato is preferable.

Among them, preferable are methyl, ethyl, n-propyl, β-hydroxyethyl, β-sulfatoethyl, β-sulfoethyl, β-methoxyethyl, β-carboxyethyl and the like.

As the unsubstituted or substituted phenyl represented by $R_2$, phenyl unsubstituted or substituted once or twice by a substituent selected from the group consisting of alkyl having 1–4 carbon atoms, alkoxy having 1–4 carbon atoms, sulfo, carboxy, nitro, chloro and bromo is preferable.

Among them, preferable are 2-, 3- or 4-sulfophenyl, 2,4- or 2,5-disulfophenyl, 2-, 3- or 4-carboxyphenyl, 2-carboxy-4- or 5-sulfophenyl and the like.

Particularly preferable are 2,4- or 2,5-disulfophenyl and the like.

The compound of the present invention may be in the form of a free acid or a salt thereof, preferably in the form of an alkali metal salt or an alkaline earth metal salt, especially preferably in the form of sodium salt, potassium salt and lithium salt.

The compound of the present invention can be produced, for example, in the following manner. Thus, a compound represented by the following formula (VIII) in the free acid form:

(VIII)

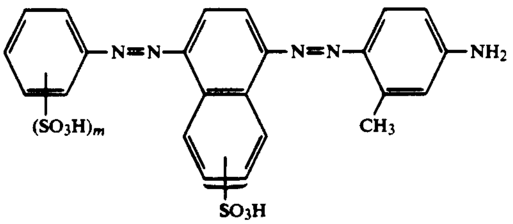

wherein m is as defined above, a compound represented by the following formula (IX):

(IX)

wherein R, A and Z are as defined above, and a compound represented by the following formula (X):

H—X (X)

wherein X is as defined above, are subjected to a condensation reaction, in an optional order, with 2,4,6-trihalogeno-s-triazine to obtain the compound of the formula (I).

In the condensation reaction between 2,4,6-trihalogeno-s-triazine and the amine compounds, the order of the reactions is not critical. Taking the yield and quality of the compound of the formula (I) into consideration, however, it is desirable to condense an amine compound having a lower reactivity with 2,4,6-trihalogeno-s-triazine with priority to the other amine compounds.

Although the conditions of the condensation reaction is not critical, the condensation reaction is carried out primarily at a temperature of −10° C. to 40° C. at pH 2–9, secondarily at a temperature of 0°–70° C. at pH 2–9, and tertiarily at a temperature of 10°–100° C. at pH 2–9, whereby the compound represented by the formula (I) or a salt thereof can be obtained.

As the starting 2,4,6-trihalogeno-s-triazine, cyanuric chloride and cyanuric fluoride are particularly preferred.

As the compound represented by formula (X), mention may be made of, for example, ammonia; aromatic amines such as 1-aminobenzene, 1-amino-2-, -3- or -4-methylbenzene, 1-amino-3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-aminophenylmethanesulfonic acid, 2-, 3- or 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 3-amino-4-carboxybenzenesulfonic acid, 4-amino-3-carboxybenzenesulfonic acid, 1-methylamino-3- or -4-methylbenzene, 1-ethylamino-4-chlorobenzene, 1-ethylamino-3- or -4-methylbenzene, 1-(2-hydroxyethyl)amino-3-methylbenzene, 3- or 4-methlaminobenzoic acid, 3- or 4-methylaminobenzenesulfonic acid and the like; and aliphatic amines such as methylamine, ethylamine, n-propylamine, isopropylamine, n-butylamine, isobutylamine, sec-butylamine, dimethylamine, diethylamine, methylethylamine, allylamine, 2-chlorethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocaproic acid, cyclohexylamine, cyclopentylamine, cycloheptylamine, morpholine, pyrrolidine, piperidine, piperazine and the like.

Among them, 2-, 3- or 4-aminobenzenesulfonic acid, 6-aminobenzene-1,3-disulfonic acid, 6-aminobenzene-1,4-disulfonic acid, 2-aminoethanesulfonic acid and 2-methylaminoethanesulfonic acid are preferable.

The compound of the present invention has a fiber-reactivity and can be used for dyeing or printing a hydroxy group- or carbonamide group-containing material. Preferably, the material to be dyed or printed is in the form of a fiber material or a mixed fiber material thereof.

The hydroxy group-containing material includes natural and synthetic hydroxy group-containing materials such as cellulose fiber materials, their regenerated products and polyvinyl alcohol. As the cellulose fiber materials, cotton and other plant fibers such as linen, flax, hemp, jute and ramie fibers are preferred. As the regenerated cellulose fibers, viscose rayon staple and viscose rayon filament can be referred to.

The carbonamide group-containing material includes synthetic and natural polyamides and polyurethane. particularly in the form of a fiber, it includes wool and other animal furs, silk, leather, polyamide-6,6, polyamide-6, polyamide-11 and polyamide-4.

The compound of the present invention can be used for dyeing or printing the above materials, especially the fiber materials in a manner depending on physical and chemical properties of the materials.

For example, exhaustion dyeing of the cellulose fibers can be carried out at a relatively low temperature in the presence of an acid binding agent such as sodium carbonate, sodium tertiary phosphate or sodium hydroxide, optionally with addition of a neutral salt such as sodium sulfate or sodium chloride and besides, dissolving assistants, penetrants or level dyeing agents. The neutral salt which promotes the exhaustion of the dye may be added only after reaching the intrinsic dyeing temperature or before reaching that temperature and if desired, may be added in portions.

When cellulose fibers are dyed by padding method, the fibers are padded at room or elevated temperature and dried and then subjected to steaming or dry-heating to perform dye-fixation.

Printing of cellulose fibers can be carried out in one-phase, by printing with a printing paste containing an acid binding agent such as sodium bicarbonate, followed by steaming at 95°–160° C. or in two-phase, by printing with a neutral or weakly acidic printing paste and passing the fibers through a hot alkaline bath containing an electrolyte or over-padding the fibers with an alkaline padding liquor containing an electrolyte, followed by steaming or dry-heating treatment.

For preparation of the printing paste, a paste or emulsifier such as sodium alginate or starch ether is used optionally together with a conventional printing assistant such as urea and/or a dispersant.

Examples of the acid binding agent suitable for fixing the compound of the present invention onto cellulose fibers are water-soluble basic salts formed between an alkali metal or an alkaline earth metal and an inorganic or organic acid or a compound liberating alkali in a heated state. Especially preferred are alkali metal hydroxides and alkali metal salts of inorganic or organic acids of weak or medium strength, among which sodium slats and potassium salts are preferred. Examples of such acid binding agent are sodium hdyroxide, potassium hydroxide, sodium bicarbonate, sodium carbonate, sodium formate, potassium carbonate, sodium primary, secondary and tertiary phosphates, sodium silicate and sodium trichloroacetate.

Dyeing of synthetic and natural polyamide and polyurethane fibers can be carried out by performing exhaustion in an acidic or weakly acidic bath at a controlled pH value and then making the bath neutral or in some cases alkaline to perform fixation. The dyeing can be carried out normally at a temperature of 60°-120° C. In order to achieve a level dyeing, there may be used a conventional level dyeing agent such as a condensation product between cyanuric chloride and 3 times by mole of aminobenzenesulfonic acid or aminonaphthalenesulfonic acid or an addition product between stearylamine and ethylene oxide.

The compound of the present invention is characterized in that it exhibits excellent performances in dyeing and printing fiber materials. It is especially useful for dyeing cellulose fiber materials and gives a dyed product excellent in light fastness, perspiration-light fastness, wet fastnesses such as washing resistance, peroxide-washing resistance, perspiration resistance, acid hydrolysis resistance and alkali hydrolysis resistance, and besides, in abrasion fastness and iron fastness.

It is further characterized by excellency in build-up, level-dyeing and washing-off properties and high solubility as well as high exhaustion and fixation percentages. Moreover, it is characterized in that it is hardly affected by changes in dyeing temperature, the amounts of acid binding agents or neutral salts and dyeing bath ratio, so that a dyed product with a stable quality can be obtained.

Furthermore, the compound of the present invention is characterized in that it is resistant to color change at the time of fixing treatment and resin treatment of dyed product and resistant to the change due to contact with basic substances during storage.

The present invention will be explained in more detail by the following examples, in which parts and % are by weight.

EXAMPLE 1

6-Aminobenzene-1,4-disulfonic acid (25.3 parts) and cyanuric chloride (18.5 parts) were condensed under acidic condition in an aqueous medium by conventional process to obtain a condensate. Then, the condensate was further condensed with a disazo compound (52.5 parts) represented by the following formula in the free acid form:

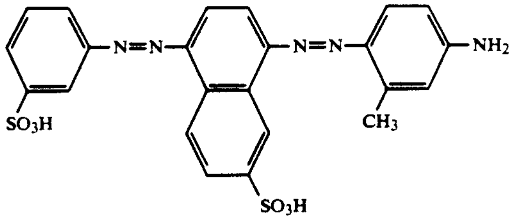

to obtain a compound represented by the following formula in the free acid form:

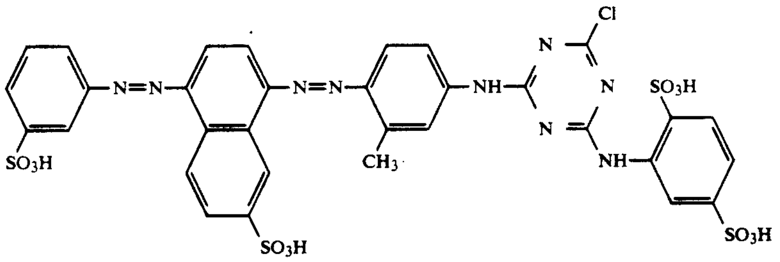

The compound thus obtained was condensed with 1-aminobenzene-3-β-sulfatoethyl sulfone (29 parts) in an aqueous medium at pH 3-5 at a temperature of 60°-80° C. to obtain a bisazo compound represented by the following formula in the free acid form:

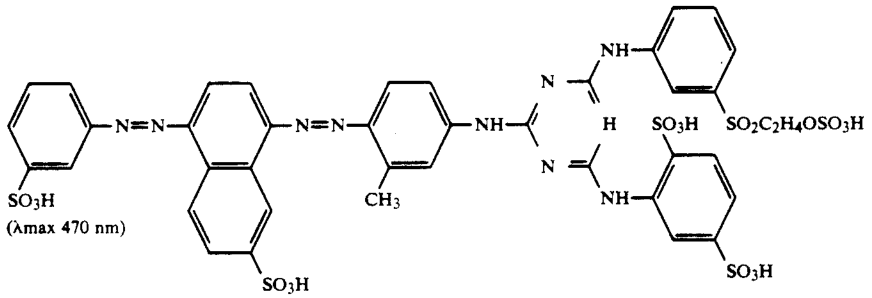

(λmax 470 nm)

EXAMPLE 2

Example 1 was repeated, except that the disazo compound, 6-aminobenzene-1,4-disulfonic acid and 1-aminobenzene-3-β-sulfatoethyl sulfone used in Example 1 were replaced with the compounds of Columns 2, 3 and 4 in the following table, respectively, to obtain the corresponding bisazo compounds. By dyeing a fiber material with each bisazo compound, there were obtained dyed products of which hues were as shown in column 5 of the table.

| 1 | 2 | 3 | 4 | 5 |
|---|---|---|---|---|
| 1 | 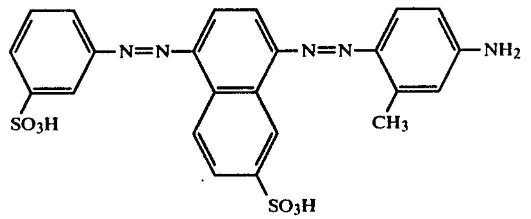 | 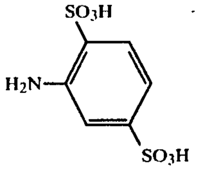 | 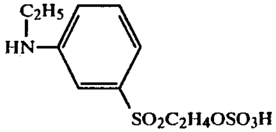 | Light brown |
| 2 | " | " |  | " |
| 3 | " | " | 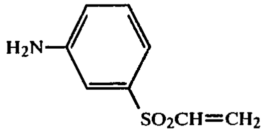 | " |
| 4 | " | 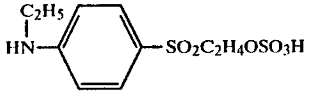 | 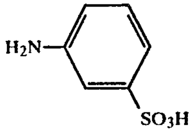 | " |
| 5 | 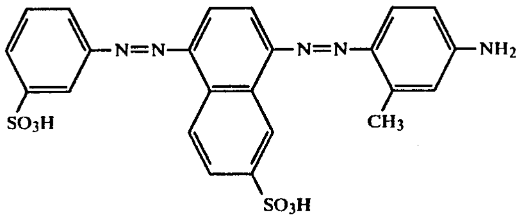 | $H_2NC_2H_4SO_3H$ | 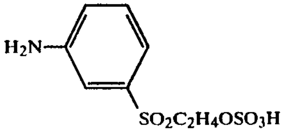 | Light brown |
| 6 | " | $CH_3$<br>\|<br>$HNC_2H_4SO_3H$ | " | " |

-continued
| 1 | 2 | 3 | 4 | 5 |
|---|---|---|---|---|
| 7 | " | " | 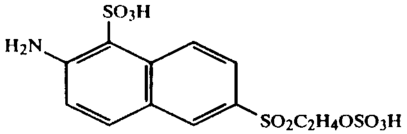 | " |
| 8 | " | 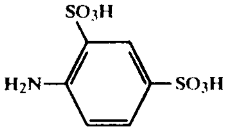 | 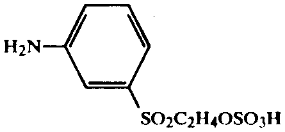 | " |
| 9 | 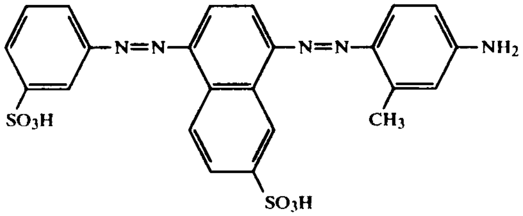 | 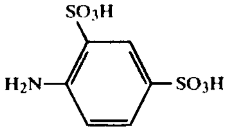 | 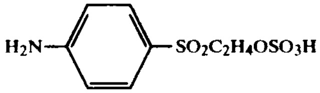 | Light brown |
| 10 | " | " | 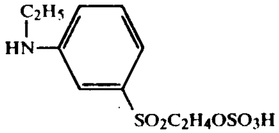 | " |
| 11 | " | 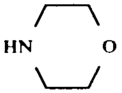 | 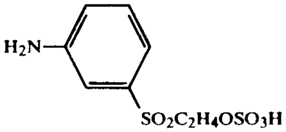 | " |
| 12 | " | 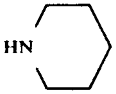 | " | " |

-continued
| 1 | 2 | 3 | 4 | 5 |
|---|---|---|---|---|
| 13 | 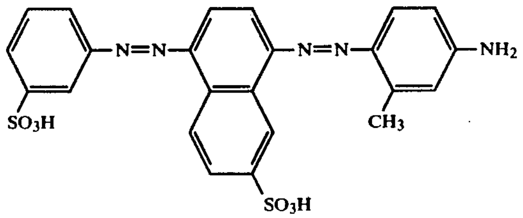 | 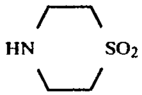 | 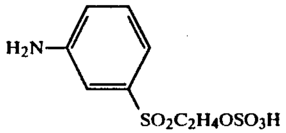 | Light brown |
| 14 | " | $H_2NC_2H_4COOH$ | 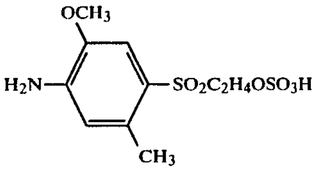 | " |
| 15 | " | 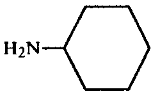 | 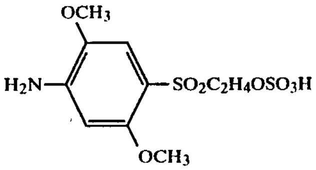 | " |
| 16 | " | 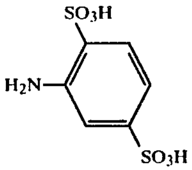 | 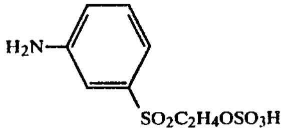 | " |
| 17 | 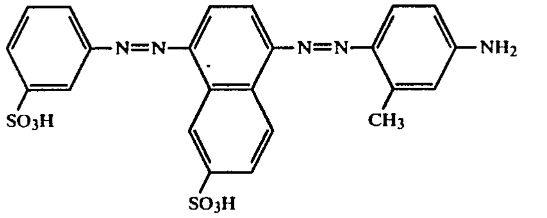 | 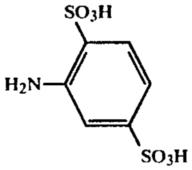 | 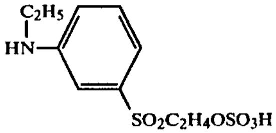 | Light brown |

-continued
| 1 | 2 | 3 | 4 | 5 |
|---|---|---|---|---|
| 18 | " | 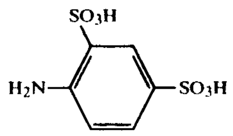 | " | " |
| 19 | " | 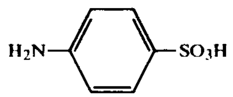 | 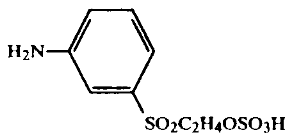 | " |
| 20 | " | 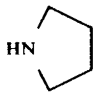 | " | " |
| 21 | 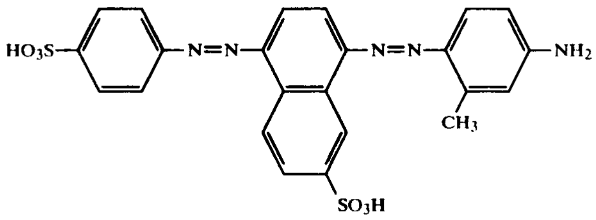 | 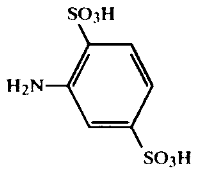 | 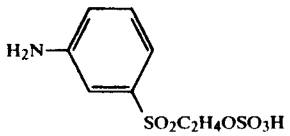 | Light brown |
| 22 | " | " | 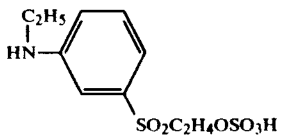 | " |
| 23 | " | 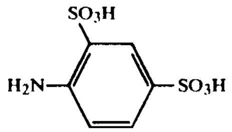 | 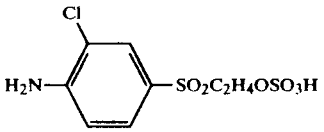 | " |

-continued
| 1 | 2 | 3 | 4 | 5 |
|---|---|---|---|---|
| 24 | 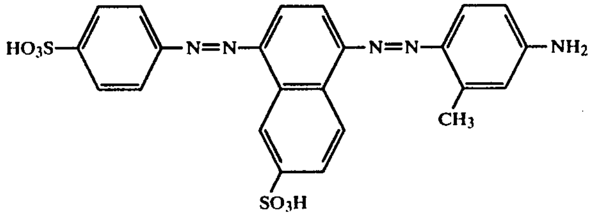 | 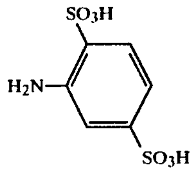 | 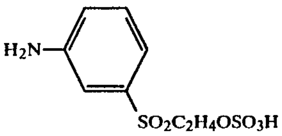 | " |
| 25 | 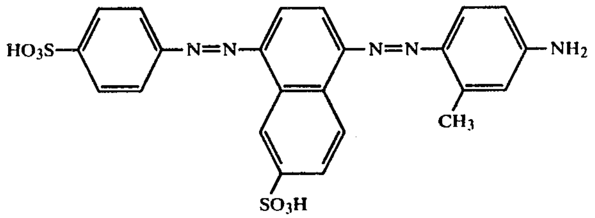 | 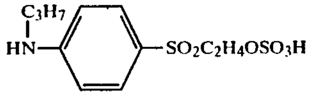 | $H_2NC_2H_4OH$ | Light brown |
| 26 | 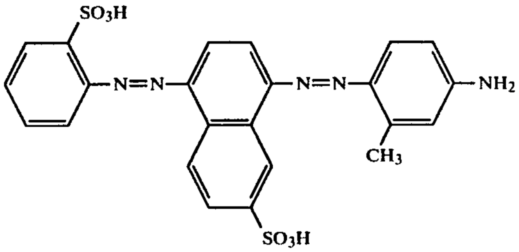 | 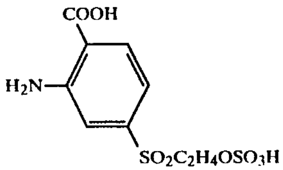 | $H_2NC_2H_4SO_3H$ | " |
| 27 | " | 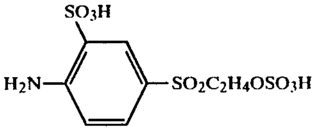 | 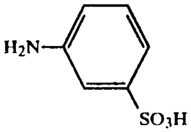 | " |

-continued
| 1 | 2 | 3 | 4 | 5 |
|---|---|---|---|---|
| 28 | 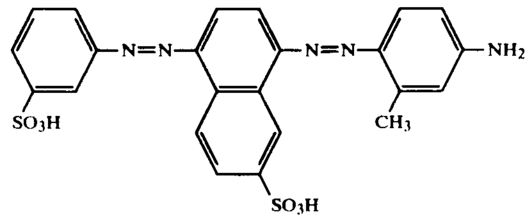 | 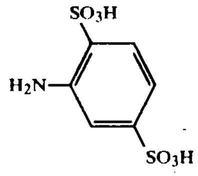 | 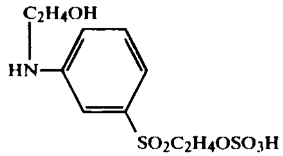 | " |
| 29 | 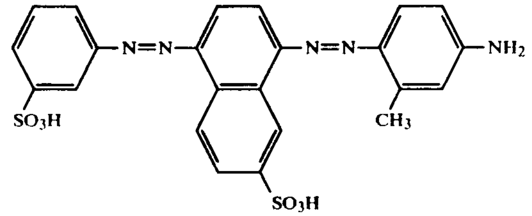 | 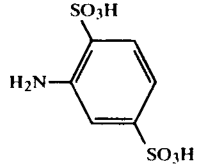 | 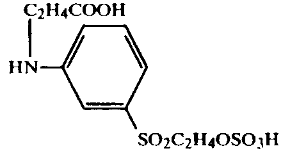 | Light brown |
| 30 | " | 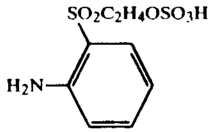 | 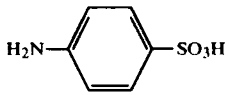 | " |
| 31 | " | 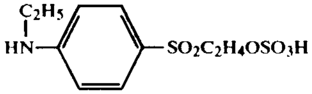 | $NH_3$ | " |
| 32 | " | 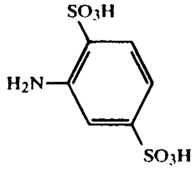 | 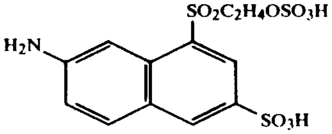 | " |

-continued
| 1 | 2 | 3 | 4 | 5 |
|---|---|---|---|---|
| 33 | 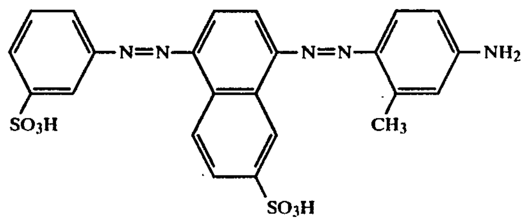 | 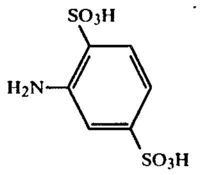 | 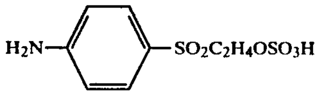 | Light brown |
| 34 | " | " | 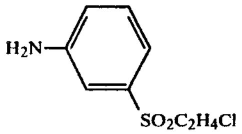 | " |
| 35 | " | 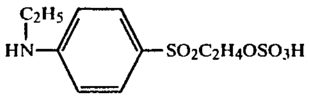 | 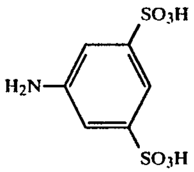 | " |
| 36 | 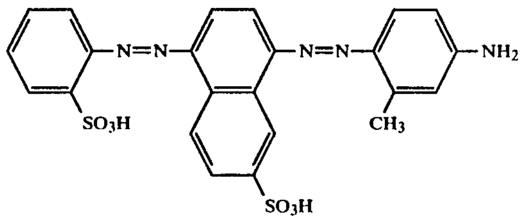 | 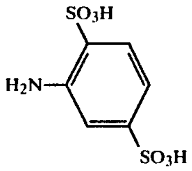 | 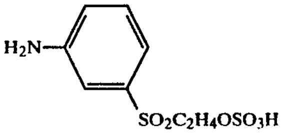 | Light brown |
| 37 | " | " | 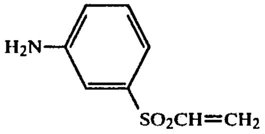 | " |

-continued
| 1 | 2 | 3 | 4 | 5 |
|---|---|---|---|---|
| 38 | " | " | 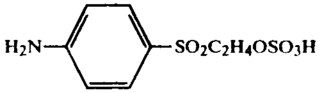 | " |
| 39 | " | " | 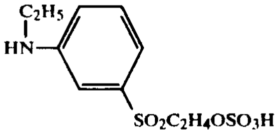 | " |
| 40 | 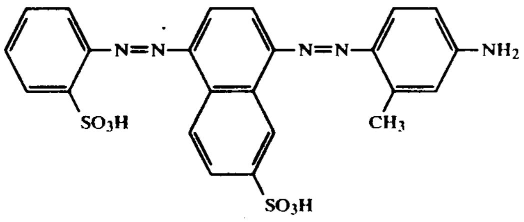 | 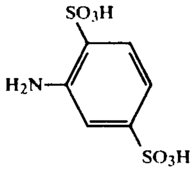 | 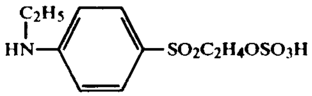 | Light brown |
| 41 | " | " | 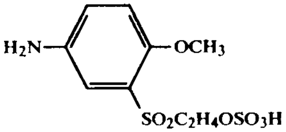 | " |
| 42 | " | 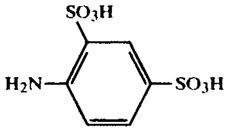 | 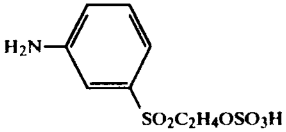 | " |
| 43 | " | " | 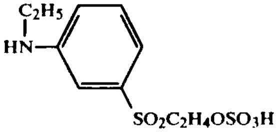 | " |

-continued
| 1 | 2 | 3 | 4 | 5 |
|---|---|---|---|---|
| 44 | 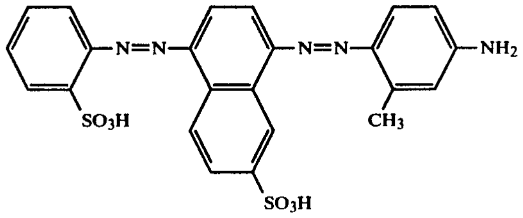 | 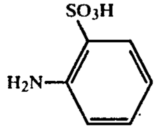 | 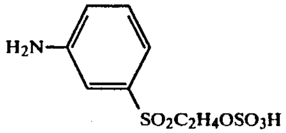 | Light brown |
| 45 | " | 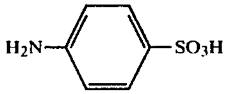 | " | " |
| 46 | 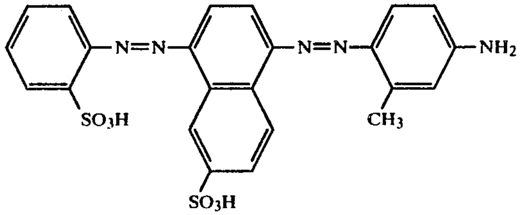 | 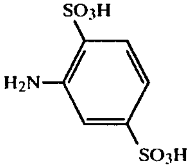 | 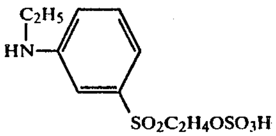 | " |
| 47 | " | " | 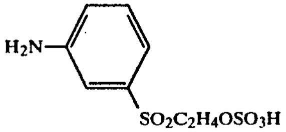 | " |
| 48 | 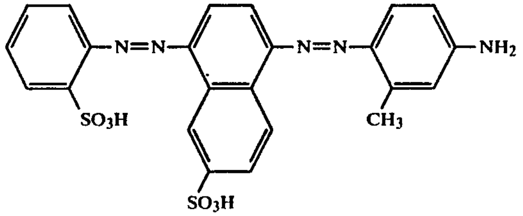 | 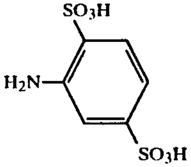 | 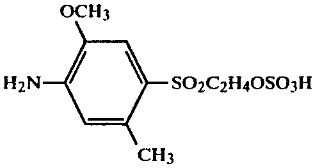 | Light brown |

-continued
| 1 | 2 | 3 | 4 | 5 |
|---|---|---|---|---|
| 49 | 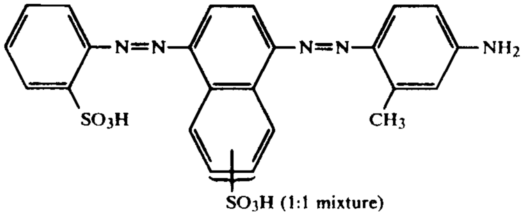 | " | 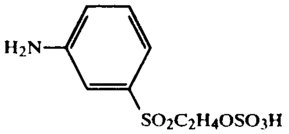 | " |
| 50 | " | " | 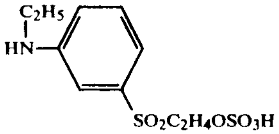 | " |

EXAMPLE 3

2-Aminobenzene-1,4-disulfonic acid (25.3 parts) was condensed with cyanuric chloride (18.5 parts) in an aqueous medium under acidic condition by conventional process to obtain a condensate. Then, the condensate was condensed with a disazo compound (60.5 parts) represented by the following formula in the free acid form:

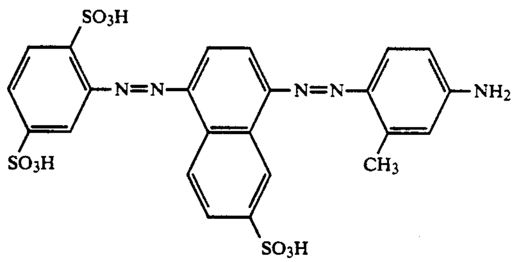

by conventional process to obtain a compound represented by the following formula in the free acid form:

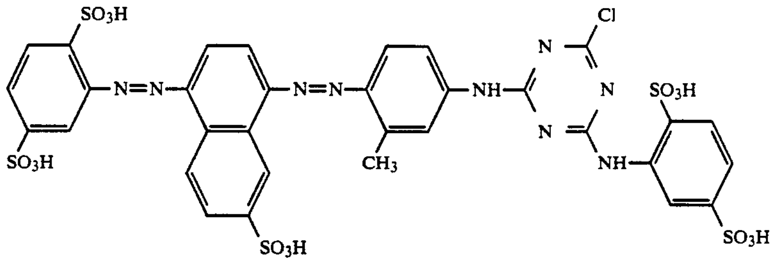

Then, it was further condensed with 1-aminobenzene-3-$\beta$-sulfatoethyl sulfone (28.5 parts) at a temperature of 60°-80° C. at pH 3-5 to obtain a bisazo compound represented by the following formula in the free acid form:

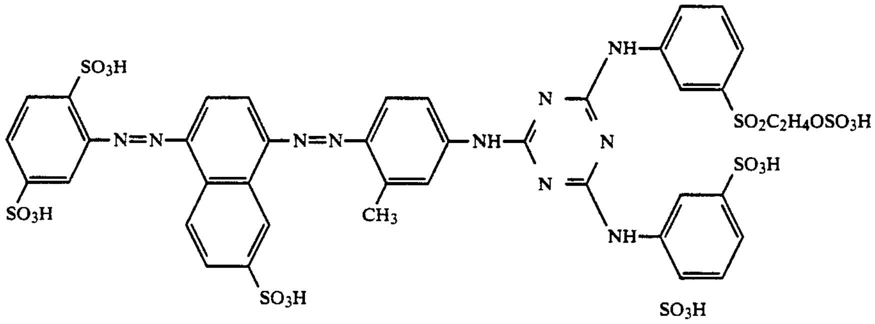

($\lambda$max 462 nm)

EXAMPLE 4

Example 3 was repeated, except that the disazo compound, 2-aminobenzene-1,4-disulfonic acid and 1-aminobenzene-3-$\beta$-sulfatoethyl sulfone used in Example 3 were replaced with the compounds of Columns 2, 3 and 4 of the following table, respectively, to form the corresponding bisazo compounds. By dyeing a fiber material with each bisazo compound, there were obtained dyed products of which hues were as shown in Column 5 of the table.

| 1 | 2 | 3 | 4 | 5 |
|---|---|---|---|---|
| 1 | 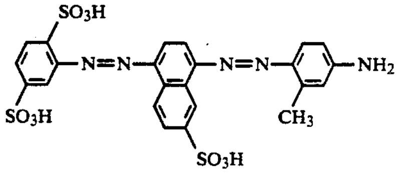 | 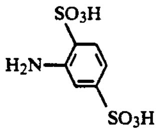 | 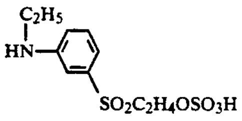 | Light brown |
| 2 | " | " | 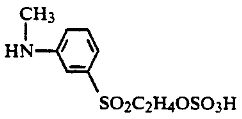 | " |

-continued
| 1 | 2 | 3 | 4 | 5 |
|---|---|---|---|---|
| 3 | " | " | 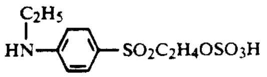 | " |
| 4 | " | " | 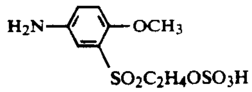 | " |
| 5 | 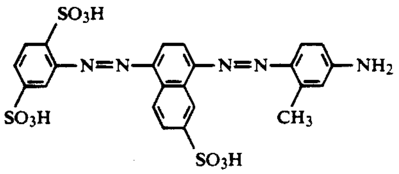 | 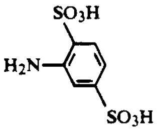 | 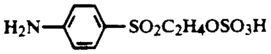 | Light brown |
| 6 | " | " | 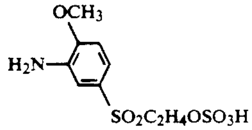 | " |
| 7 | " | " | 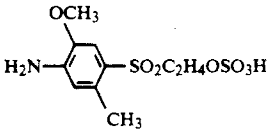 | " |
| 8 | " | " | 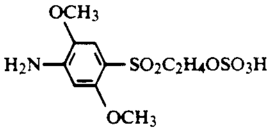 | " |
| 9 | 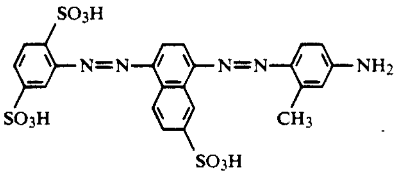 | 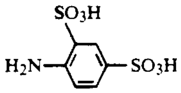 | 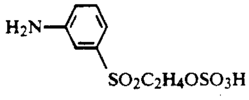 | Light brown |
| 10 | " | " | 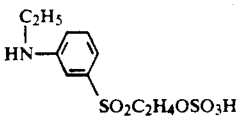 | " |
| 11 | 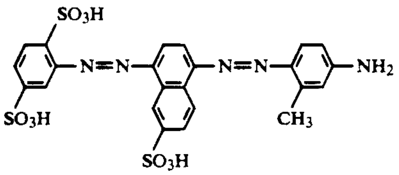 | 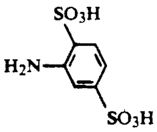 | 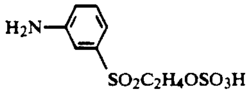 | " |
| 12 | " | " | 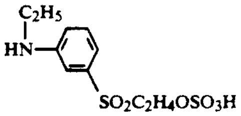 | " |
| 13 | 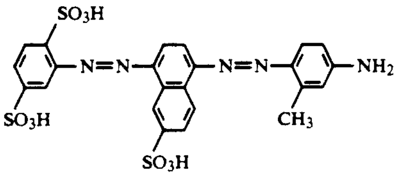 | 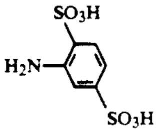 | 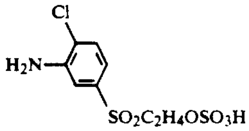 | Light brown |

-continued
| 1 | 2 | 3 | 4 | 5 |
|---|---|---|---|---|
| 14 | 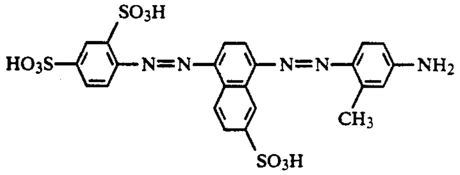 | ″ | 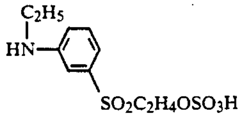 | ″ |
| 15 | ″ | ″ | 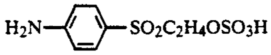 | ″ |
| 16 | ″ | 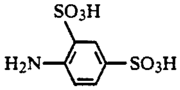 | 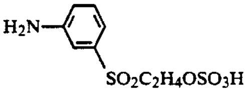 | ″ |
| 17 | 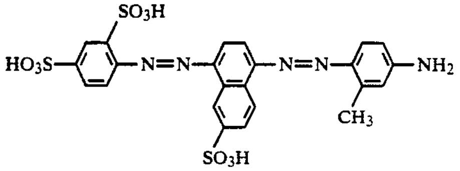 | 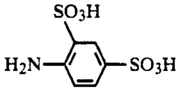 | 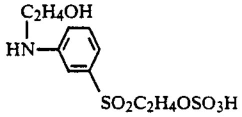 | Light brown |
| 18 | ″ | 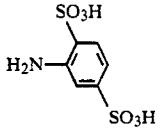 | 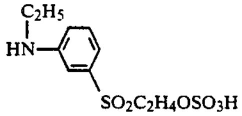 | ″ |
| 19 | ″ | ″ | 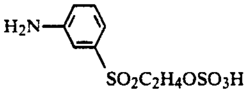 | ″ |
| 20 | 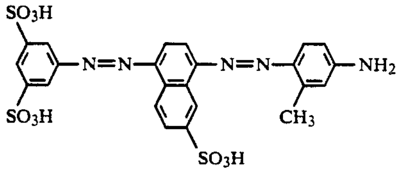 | ″ | ″ | ″ |
| 21 | 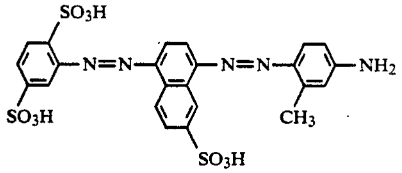 | 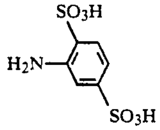 | 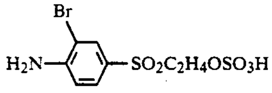 | Light brown |
| 22 | ″ | ″ | 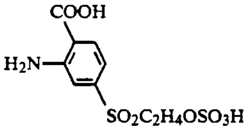 | ″ |
| 23 | ″ | ″ | 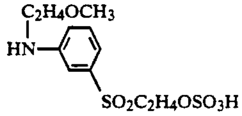 | ″ |
| 24 | ″ | ″ | 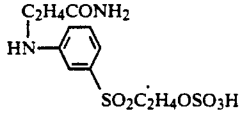 | ″ |

-continued

| 1 | 2 | 3 | 4 | 5 |
|---|---|---|---|---|
| 25 | 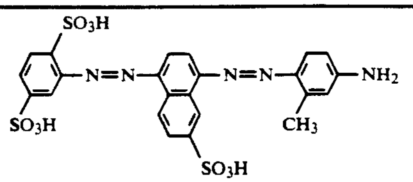 | 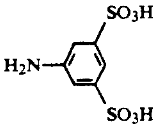 | 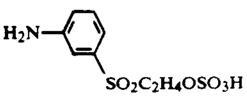 | Light brown |

DYEING EXAMPLE 1

Each of the bisazo compounds obtained in Examples 1–4 (0.3 part) was dissolved in water (200 parts). After adding sodium sulfate (20 parts) and cotton (10 parts) thereto, the temperature was elevated to 50° C. Then, after elapse of 30 minutes, sodium carbonate (4 parts) was added and dyeing was carried out for one hour at that temperature. After completion of dyeing, the dyed cotton was washed with water and soaped to obtain light brown colored dyed products high in density and excellent in fastnesses, especially chlorine fastness, light fastness and perspiration-light fastness and having excellent build-up property.

DYEING EXAMPLE 2

Each of the bisazo compounds obtained in Examples 1–4 (0.3 parts) was dissolved in water (300 parts). After adding sodium sulfate (30 parts) and cotton (10 parts) thereto, the temperature was elevated to 60° C. Then, after elapse of 20 minutes, sodium carbonate (5 parts) was added and dyeing was carried out for one hour at that temperature. After completion of dyeing, the dyed cotton was washed with water and soaped to obtain light brown colored dyed products high in density and excellent in fastnesses, especially light fastness and perspiration-light fastness, and having excellent build-up property.

DYEING EXAMPLE 3

| Composition of color paste | |
|---|---|
| Each of the bisazo compounds obtained in Examples 1–4 | 5 parts |
| Urea | 5 parts |
| Sodium alginate (5%) stock paste | 50 parts |
| Hot water | 25 parts |
| Sodium bicarbonate | 2 parts |
| Water (balance) | 13 parts |

A mercerized cotton broad cloth was printed with the color paste having the above composition. After intermediate drying, it was steamed at 100° C. for 5 minutes, washed with hot water, soaped, washed with hot water and dried.

The dyed products thus obtained had light brown color and were high in fixation percentage, excellent in fastnesses, especially light fastness and perspiration-light fastness, and excellent in build-up property.

DYEING EXAMPLE 4

Each of the bisazo compounds obtained in Examples 1–4 (25 parts) was dissolved in hot water and cooled to 25° C. Thereto were added 32.5% aqueous sodium hydroxide solution (5.5 parts) and water-glass of 50 Baumé degree (150 parts) and water was further added to make up the total amount to 1,000 parts at 25° C. Immediately thereafter, a cotton woven cloth was subjected to padding in the resultant liquor as a pad bath and taken up and wrapped with a polyethylene film and stored in a room at 20° C.

A cotton woven cloth subjected to padding, taken up and wrapped with a polyethylene film in the same manner as above was stored in a room at 5° C. These padded cloths were left to stand for 20 hours and then the dyed products were washed with cold water and then hot water. Then, they were soaped in a boiling detergent, further washed with cold water and dried.

The dyed products left to stand at 20° C. for 20 hours and the dyed products left to stand at 5° C. for 20 hours were evaluated on differences in hue and density. Substantially no differences were recognized. Furthermore, dyed products of excellent build-up property were obtained by cold batch up dyeing.

DYEING EXAMPLE 5

Each of the bisazo compounds obtained in Examples 1–4 (25 parts) was dissolved in hot water and cooled to 25° C. Thereto were added 32.5% aqueous sodium hydroxide solution (10 parts) and anhydrous sodium sulfate (30 parts) and water was further added to make up the total amount to 1,000 parts at 25° C. Immediately thereafter, a viscose rayon woven cloth was subjected to padding in the resultant liquor as a pad bath and taken up and wrapped with a polyethylene film and stored in a room at 20° C.

A viscose rayon woven cloth subjected to padding, taken up and wrapped with a polyethylene film in the same manner as above was stored in a room at 5° C.

These padded cloths were left to stand for 20 hours and then the dyed products were washed with cold water and then hot water. Then, they were soaped in a boiling detergent, further washed with cold water and dried.

The dyed products left to stand at 20° C. for 20 hours and the dyed products left to stand at 5° C. for 20 hours were evaluated on differences in hue and density. Substantially no differences were recognized.

DYEING EXAMPLE 6

Dyeing Example 2 was repeated except that sodium carbonate was used in an amount of 3 parts in place of 5 parts to obtain dyed products having the same quality as in Dyeing Example 2 with the respective bisazo compounds.

DYEING EXAMPLE 7

Dyeing Example 2 was repeated except that a temperature of 50° C. was employed in place of 60° C. to obtain dyed products having the same quality as in Dyeing Example 2 with the respective bisazo compounds. The same results were obtained when the temperature was 70° C.

DYEING EXAMPLE 8

Dyeing Example 2 was repeated except that sodium sulfate was used in an amount of 15 parts in place of 30 parts to obtain dyed products having the same quality as in Dyeing Example 2 with the respective bisazo compounds.

What is claimed is:

1. A bisazo compound represented by the following formula (I) in the free acid form:

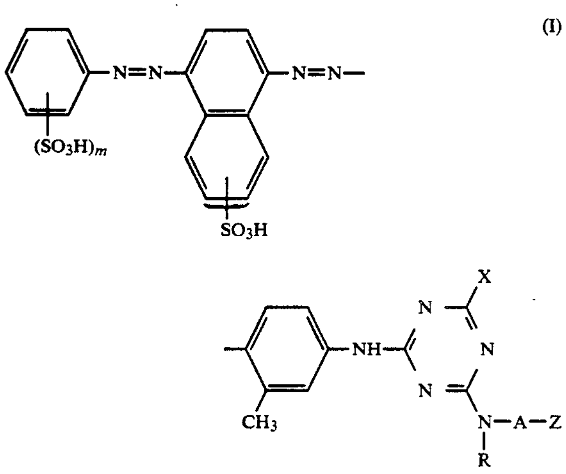

(I)

wherein R is hydrogen or unsubstituted or substituted $C_1$-$C_4$ alkyl; A is an unsubstituted or substituted phenylene or naphthylene group; Z is —$SO_2CH{=}CH_2$ or —$SO_2CH_2CH_2Y$, in which Y is a group capable of being split by the action of an alkali; X is —$NR_1R_2$, $C_5$-$C_7$ cycloalkylamino or

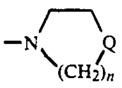

in which Q is —$CH_2$—, —O—, —$SO_2$—, —SO— or —$NR_3$— in which $R_3$ is hydrogen or $C_1$-$C_4$ alkyl; and n is 1 or 2, $R_1$ is hydrogen or unsubstituted or substituted alkyl; $R_2$ is hydrogen or an unsubstituted or substituted alkyl or phenyl group; and m is 1 or 2, provided that when m is 2, X is

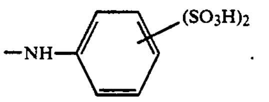

2. A bisazo compound according to claim 1, which is represented by the following formula (II) in the free acid form:

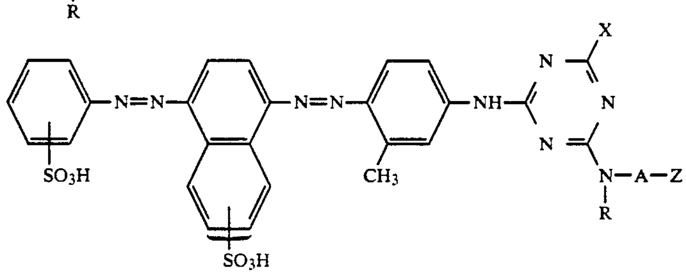

(II)

wherein R, A, Z and X are as defined in claim 1.

3. A bisazo compound according to claim 2, which is represented by the following formula (III) in the free acid form:

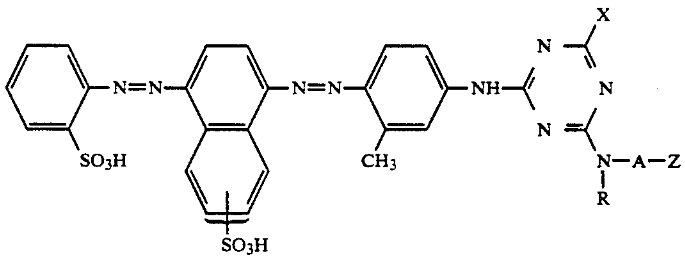

(III)

wherein R, A, Z and X are as defined in claim 2.

4. A bisazo compound according to claim 2, which is represented by the following formula (IV) in the free acid form:

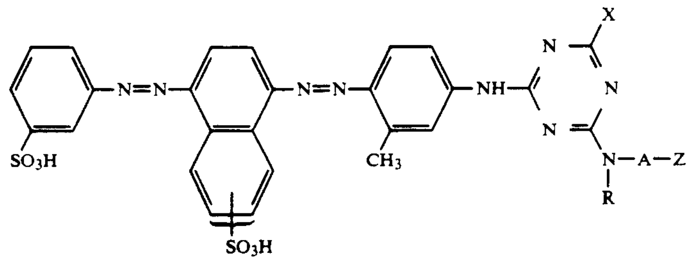

(IV)

wherein R, A, Z and X are as defined in claim 2.

5. A bisazo compound according to claim 2, wherein X is —$NR_1R_2$ in which $R_1$ is hydrogen or $C_1$–$C_4$ alkyl; and $R_2$ is an unsubstituted or substituted $C_1$–$C_4$ alkyl group or phenyl which is unsubstituted or substituted once or twice by sulfo, carboxy, chloro, bromo, nitro, methyl or methoxy.

6. A bisazo compound according to claim 2, wherein X is —$NR_1R_2$ in which $R_1$ is hydrogen; and $R_2$ is sulfophenyl or disulfophenyl.

7. A bisazo compound according to claim 1, which is represented by the following formula (V) in the free acid form:

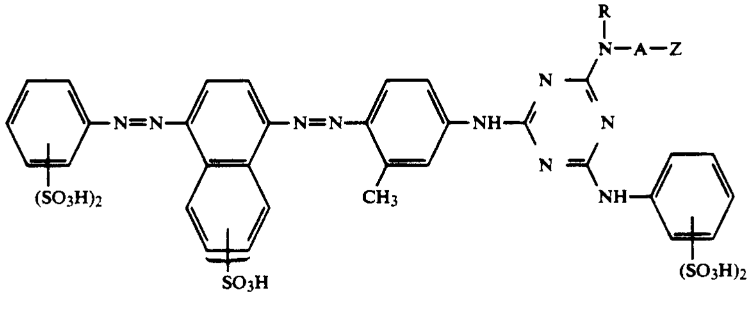

(V)

wherein R, A and Z are as defined in claim 1.

8. A bisazo compound according to claim 7, which is represented by the following formula (VI)

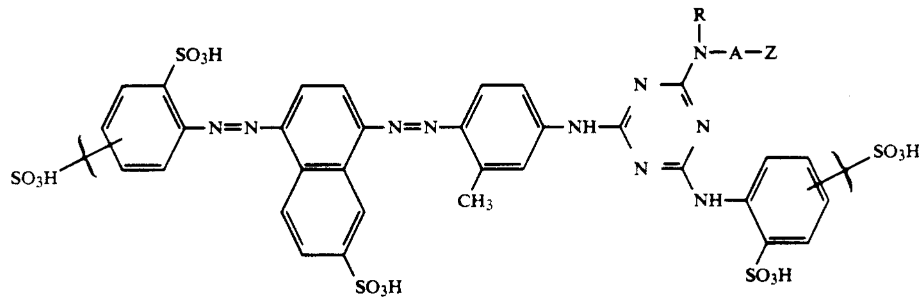

(VI)

wherein R, A and Z are as defined in claim 7.

9. A bisazo compound according to claim 8, which is represented by the following formula (VII)

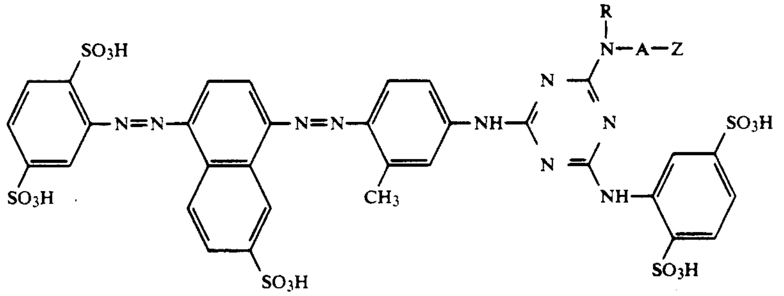

(VII)

wherein R, A and Z are as defined in claim 8.

10. A bisazo compound according to claim 1, wherein A is phenylene which is unsubstituted or substituted once or twice by methyl, methoxy, chloror, bromo, nitro, carboxy or sulfo.

11. A bisazo compound according to claim 10, wherein A is phenylene which is unsubstituted or substituted by methyl or methoxy.

12. A bisazo compound according to claim 1, wherein R is hydrogen, methyl or ethyl.

13. A bisazo compound according to claim 1, wherein Z is $-SO_2CH{=}CH_2$ or $-SO_2CH_2CH_2OSO_3H$.

14. A process for dyeing or printing hydroxy group and/or amide group-containing fiber materials, which comprises applying thereto the bisazo compound according to claim 1.

15. Fiber materials dyed or printed by the process of claim 14.

* * * * *